US007456787B2

(12) United States Patent
Manasson et al.

(10) Patent No.: US 7,456,787 B2
(45) Date of Patent: Nov. 25, 2008

(54) BEAM-FORMING ANTENNA WITH AMPLITUDE-CONTROLLED ANTENNA ELEMENTS

(75) Inventors: Vladimir A. Manasson, Irvine, CA (US); Lev S. Sadovnik, Irvine, CA (US)

(73) Assignee: Sierra Nevada Corporation, Spark, NV (US)

( * ) Notice: Subject to any disclaimer, the term of this patent is extended or adjusted under 35 U.S.C. 154(b) by 160 days.

(21) Appl. No.: 11/201,680

(22) Filed: Aug. 11, 2005

(65) Prior Publication Data

US 2007/0035442 A1 Feb. 15, 2007

(51) Int. Cl.
*H01Q 3/22* (2006.01)
*H01Q 3/00* (2006.01)
*G01S 1/00* (2006.01)
*H04B 7/185* (2006.01)

(52) U.S. Cl. ................... 342/375; 342/372; 342/357.02

(58) Field of Classification Search ................. 342/154, 342/408, 354, 371–375, 368, 357.02; 343/844
See application file for complete search history.

(56) References Cited

U.S. PATENT DOCUMENTS 2,286,839 A * 6/1942 Schelkunoff ................ 343/844
2,415,933 A * 2/1947 Brown ........................ 342/385
3,460,145 A * 8/1969 Johnson ...................... 342/371
3,780,372 A * 12/1973 Unz ........................... 343/844
3,916,417 A 10/1975 Wong et al. ................. 343/854
3,990,077 A * 11/1976 Beaulieu et al. ............. 342/368
4,180,817 A * 12/1979 Sanford ............... 343/700 MS
4,309,769 A * 1/1982 Taylor, Jr. .................... 375/139
4,559,605 A * 12/1985 Norsworthy ................ 708/403
4,580,141 A * 4/1986 Gutleber ...................... 343/844
5,003,314 A * 3/1991 Berkowitz et al. .......... 342/372
5,053,983 A * 10/1991 Hyatt ......................... 708/306
5,339,086 A * 8/1994 DeLuca et al. .............. 342/371
5,479,177 A * 12/1995 Rudish et al. ............... 342/375
5,493,306 A * 2/1996 Rudish et al. ............... 342/371
5,543,805 A * 8/1996 Thaniyavarn ............... 342/368

(Continued)

OTHER PUBLICATIONS

Yian Chang et. al., Dec. 1996, IEEE Photonics Technology Letters, vol. 8, No. 12.*

(Continued)

*Primary Examiner*—Thomas H. Tarcza
*Assistant Examiner*—Harry Liu
(74) *Attorney, Agent, or Firm*—Klein, O'Neill & Singh, LLP

(57) ABSTRACT

A beam-forming antenna for transmission and/or reception of an electromagnetic signal having a given wavelength in a surrounding medium includes a transmission line electromagnetically coupled to an array of individually controllable antenna elements, each of which is oscillated by the signal with a controllable amplitude. The antenna elements are arranged in a linear array and are spaced from each other by a distance that does not exceed one-third the signal's wavelength in the surrounding medium. The oscillation amplitude of each of the individual antenna elements is controlled by an amplitude controlling device, such as a switch, a gain-controlled amplifier, or a gain-controlled attenuator. The amplitude controlling devices, in turn, are controlled by a computer that receives as its input the desired beamshape, and that is programmed to operate the amplitude controlling devices in accordance with a set of stored amplitude values derived empirically for a set of desired beamshapes.

22 Claims, 12 Drawing Sheets

U.S. PATENT DOCUMENTS

| | | | | |
|---|---|---|---|---|
| 5,734,345 | A * | 3/1998 | Chen et al. | 342/74 |
| 5,751,248 | A * | 5/1998 | Thaniyavarn | 342/368 |
| 6,232,920 | B1 * | 5/2001 | Brookner et al. | 342/372 |
| 6,900,775 | B2 * | 5/2005 | Shapira | 343/844 |
| 2002/0021246 | A1 * | 2/2002 | Martek et al. | 342/373 |
| 2002/0057219 | A1 * | 5/2002 | Obayashi | 342/372 |
| 2002/0154687 | A1 * | 10/2002 | Bierly et al. | 375/222 |
| 2002/0171583 | A1 * | 11/2002 | Purdy et al. | 342/368 |
| 2003/0043071 | A1 * | 3/2003 | Lilly et al. | 342/368 |
| 2004/0183741 | A1 * | 9/2004 | Nakamura | 343/844 |
| 2005/0057421 | A1 * | 3/2005 | Mohamadi | 343/853 |
| 2005/0088337 | A1 * | 4/2005 | Lorenz | 342/357.02 |
| 2007/0024840 | A1 * | 2/2007 | Fetzer et al. | 356/4.01 |

OTHER PUBLICATIONS

Yian Change et. al., Mar. 1997, IEEE Microwave and Guided Wave Ltters, vol. 7, No. 3.*

R.C. Johnson, H. Jasik; "Antenna Engineering Handbook"; 1984; McGraw Hill Book Company; New York; XP002402376; pp. 3-7.

Examination Report on corresponding foreign application from the European Patent Office dated Sep. 5, 2007.

* cited by examiner

BEAM-FORMING ANTENNA WITH AMPLITUDE-CONTROLLED ANTENNA ELEMENTS

CROSS-REFERENCE TO RELATED APPLICATION

Not Applicable

FEDERALLY SPONSORED RESEARCH OR DEVELOPMENT

Not Applicable

BACKGROUND OF THE INVENTION

This invention relates generally to the field of directional antennas for transmitting and/or receiving electromagnetic radiation, particularly (but not exclusively) microwave and millimeter wavelength radiation. More specifically, the invention relates to a composite beam-forming antenna comprising an array of antenna elements, wherein the shape of the transmitted or received beam is determined by controllably varying the effective oscillation amplitude of individual antenna elements. In the context of this invention, the term "beam shape " encompasses the beam direction, which is defined as the angular location of the power peak of the transmitted/received beam with respect to at least one given axis, the beamwidth of the power peak, and the side lobe distribution of the beam power curve.

Beam-forming antennas that allow for the transmission and/or reception of a highly directional electromagnetic signal are well-known in the art, as exemplified by U.S. Pat. No. 6,750,827; U.S. Pat. No. 6,211,836; U.S. Pat. No. 5,815,124; and U.S. Pat. No. 5,959,589. These exemplary prior art antennas operate by the evanescent coupling of electromagnetic waves out of an elongate (typically rod-like) dielectric waveguide to a rotating cylinder or drum, and then radiating the coupled electromagnetic energy in directions determined by surface features of the drum. By defining rows of features, wherein the features of each row have a different period, and by rotating the drum around an axis that is parallel to that of the waveguide, the radiation can be directed in a plane over an angular range determined by the different periods. This type of antenna requires a motor and a transmission and control mechanism to rotate the drum in a controllable manner, thereby adding to the weight, size, cost and complexity of the antenna system.

Other approaches to the problem of directing electromagnetic radiation in selected directions include gimbal-mounted parabolic reflectors, which are relatively massive and slow, and phased array antennas, which are very expensive, as they require a plurality of individual antenna elements, each equipped with a costly phase shifter.

There has therefore been a need for a directional beam antenna that can provide effective and precise directional transmission as well as reception, and that is relatively simple and inexpensive to manufacture.

SUMMARY OF THE INVENTION

Broadly, the present invention is a reconfigurable, directional antenna, operable for both transmission and reception of electromagnetic radiation (particularly microwave and millimeter wavelength radiation), that comprises a transmission line that is electromagnetically coupled to an array of individually controllable antenna elements, each of which is oscillated by the transmitted or received signal with a controllable amplitude.

More specifically, for each beam-forming axis, the antenna elements are arranged in a linear array and are spaced from each other by a distance that is no greater than one-third the wavelength, in the surrounding medium, of the transmitted or received radiation. The oscillation amplitude of each of the individual antenna elements is controlled by an amplitude controlling device that may be a switch, a gain-controlled amplifier, a gain-controlled attenuator, or any functionally equivalent device known in the art. The amplitude controlling devices, in turn, are controlled by a computer that receives as its input the desired beamshape, and that is programmed to operate the amplitude controlling devices in accordance with a set of stored amplitude values derived empirically, by numerical simulations, for a set of desired beamshapes.

As will be more readily appreciated from the detailed description that follows, the present invention provides an antenna that can transmit and/or receive electromagnetic radiation in a beam having a shape and, in particular, a direction that can be controllably selected and varied. Thus, the present invention provides the beam-shaping control of a phased array antenna, but does so by using amplitude controlling devices that are inherently less costly and more stable than the phase shifters employed in phased array antennas.

DETAILED DESCRIPTION OF THE INVENTION

Figure 1:
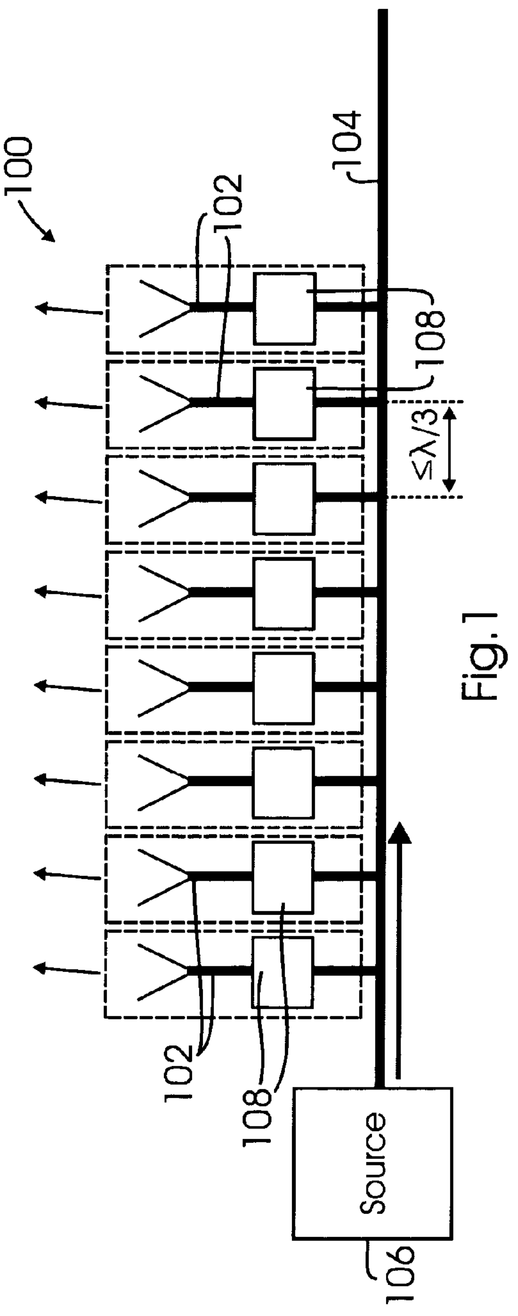
FIG. 1 is a schematic view of a beam-forming antenna in accordance with the present invention, in which the antenna is configured for transmission.
Figure 2:
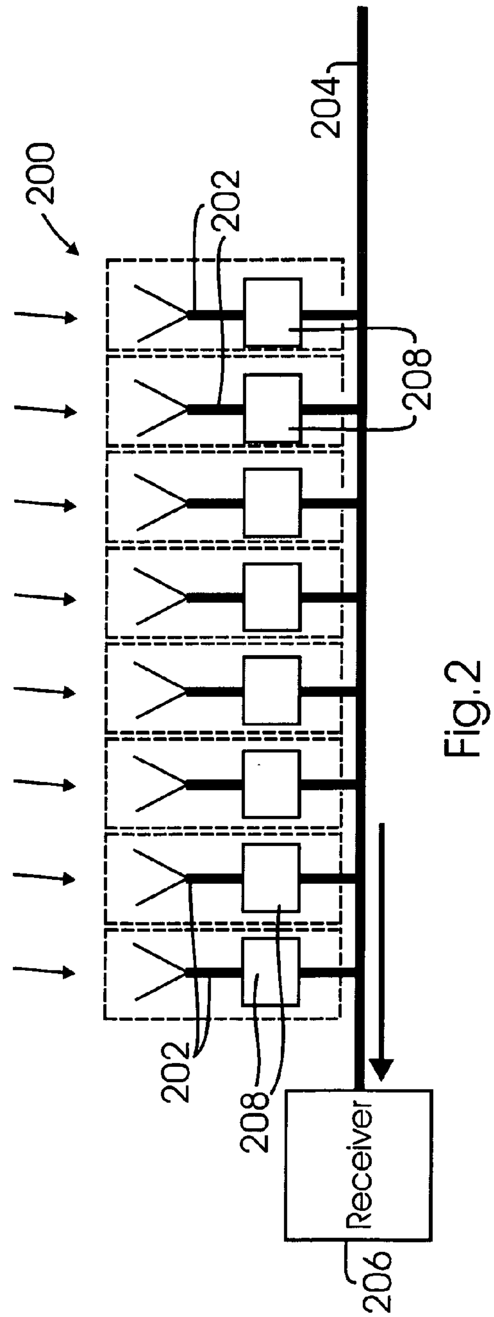
FIG. 2 is a schematic view of a beam-forming antenna in accordance with the present invention, in which the antenna is configured for reception.
Figure 3:
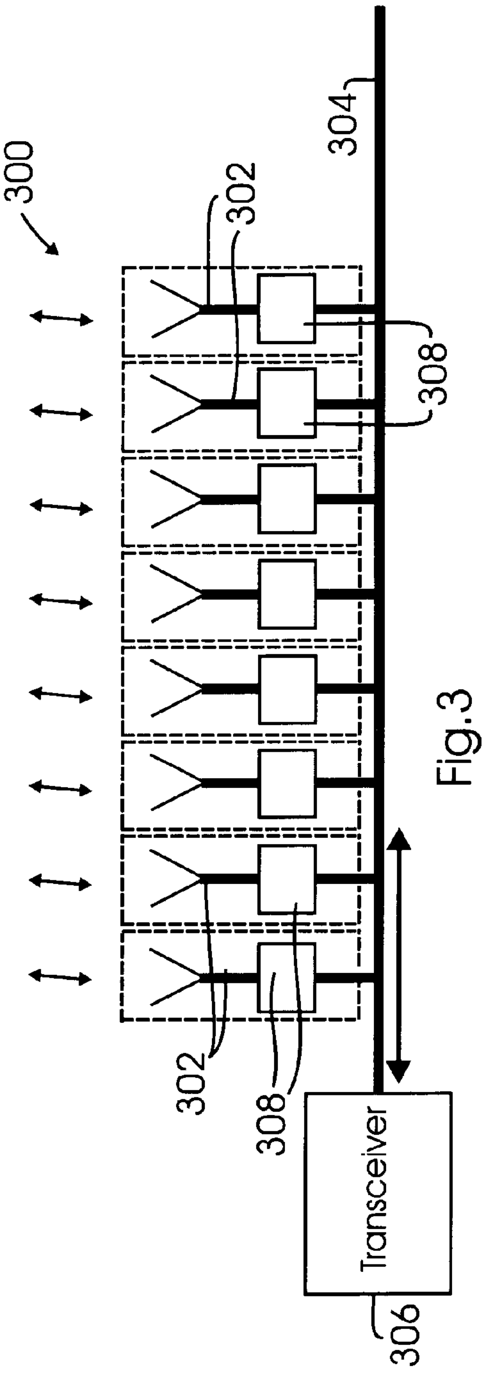
FIG. 3 is a schematic view of a beam-forming antenna in accordance with the present invention, in which the antenna is configured for both transmission and reception.

FIGS. 1, 2, and 3 respectively illustrate three configurations of a beam-forming antenna in accordance with a broad concept of the present invention. As will be described in more detail below, the beam-forming antenna in accordance with the present invention comprises at least one linear array of individual antenna elements, each of which is electromagnetically coupled to a transmission line through an amplitude controlling device, wherein the antenna elements are spaced from each other by a spacing distance that is less than or equal to one-third the wavelength, in the surrounding medium, of the electromagnetic radiation transmitted and/or received by the antenna. As shown in FIGS. 1, 2, and 3, the spacing distances between each adjacent pair of antenna elements may advantageously be equal, but as discussed below with respect to FIG. 4, these spacing distances need not be equal.

More specifically, FIG. 1 illustrates a beam-forming antenna 100 configured for transmitting a shaped beam of electromagnetic radiation in one direction (i.e., along one linear axis). The antenna 100 comprises a linear array of individual antenna elements 102, each of which is coupled (by means such as a wire, a cable, or a waveguide, or by evanescent coupling) to a transmission line 104, of any suitable type known in the art, that receives an electromagnetic signal from a signal source 106. The phase velocity of the electromagnetic signal in the transmission line 104 is less than the phase velocity in the medium (e.g., atmospheric air) in which the antenna 100 is located. Each of the antenna elements 102 is coupled to the transmission line 104 through an amplitude controlling device 108, so that the signal from the transmission line 104 is coupled to each of the antenna elements 102 through an amplitude controlling device 108 operatively associated with that antenna element 102.

FIG. 2 illustrates a beam-forming antenna 200 configured for receiving electromagnetic radiation preferentially from one direction. The antenna 200 comprises a linear array of individual antenna elements 202, each of which is coupled to a transmission line 204 that feeds the electromagnetic signal to a signal receiver 206. Each of the antenna elements 202 is coupled to the transmission line 204 through an amplitude controlling device 208, so that the signal from each of the antenna elements 202 is coupled to the transmission line 204 through an amplitude controlling device 208 operatively associated with that antenna element 202. The antenna 200 is, in all other respects, similar to the antenna 100 of FIG. 1.

FIG. 3 illustrates a beam-forming antenna 300 configured for both receiving a beam of electromagnetic radiation preferentially from one direction, and transmitting a shaped beam of electromagnetic radiation in a preferred direction. The antenna 300 comprises a linear array of individual antenna elements 302, each of which is coupled to a transmission line 304 that, in turn, is coupled to a transceiver 306. Each of the antenna elements 302 is coupled to the transmission line 304 through an amplitude controlling device 308, so that signal coupling between each antenna element 302 and the transmission line 304 is through an amplitude controlling device 308 operatively associated with that antenna element 302. The antenna 300 is, in all other respects, similar to the antennas 100 and 200 of FIGS. 1 and 2, respectively.

The amplitude controlling devices 108, 208, 308, of the antennas 100, 200, 300, respectively, may be switches, gain-controlled amplifiers, gain-controlled attenuators, or any suitable, functionally equivalent devices that may suggest themselves to those skilled in the pertinent arts. The electromagnetic signal transmitted and/or received by each antenna element 102, 202, 302 creates an oscillating signal within the antenna element, wherein the amplitude of the oscillating signal is controlled by the amplitude controlling device 108, 208, 308 operatively associated with that antenna element. The operation of the amplitude controlling devices, in turn, is controlled by a suitably programmed computer (not shown), as will be discussed below.

Figure 4:
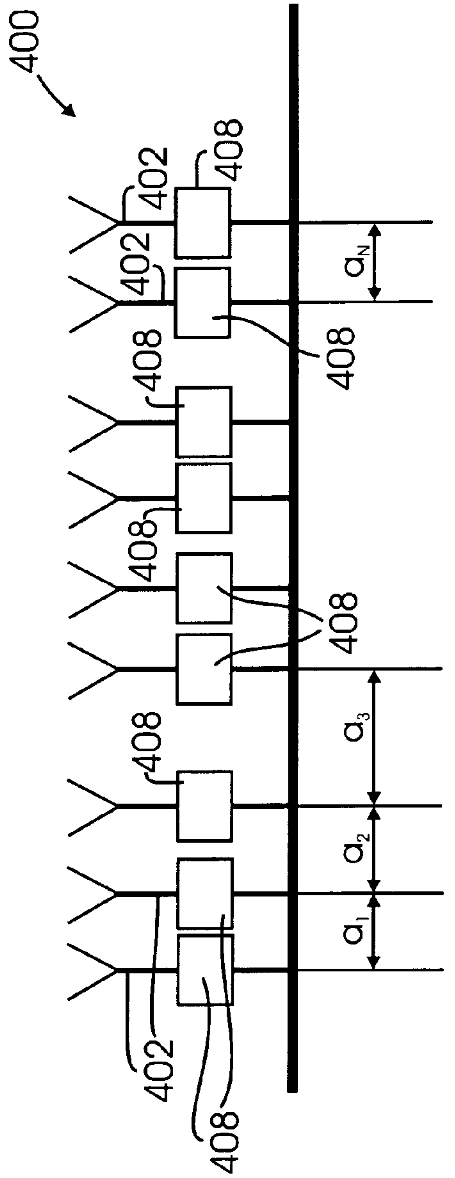
FIG. 4 is a schematic diagram of a beam-forming antenna in accordance with the present invention, in which the spacing distances between adjacent antenna elements are unequal.

FIG. 4 illustrates a beam-forming antenna 400, in accordance with the present invention, comprising a linear array of antenna elements 402 coupled to a transmission line 404 through an amplitude controlling device 408, as described above. In this variant of the invention, however, each adjacent pair of antenna elements 402 is separated by a spacing distance $a_1, \ldots a_N$, wherein the spacing distances may be different from each other, as long as all are less than or equal to one-third the wavelength of the electromagnetic signal in the surrounding medium, as mentioned above. The spacing distances may, in fact, be arbitrarily distributed, as long as this maximum distance criterion is met.

Figure 5:
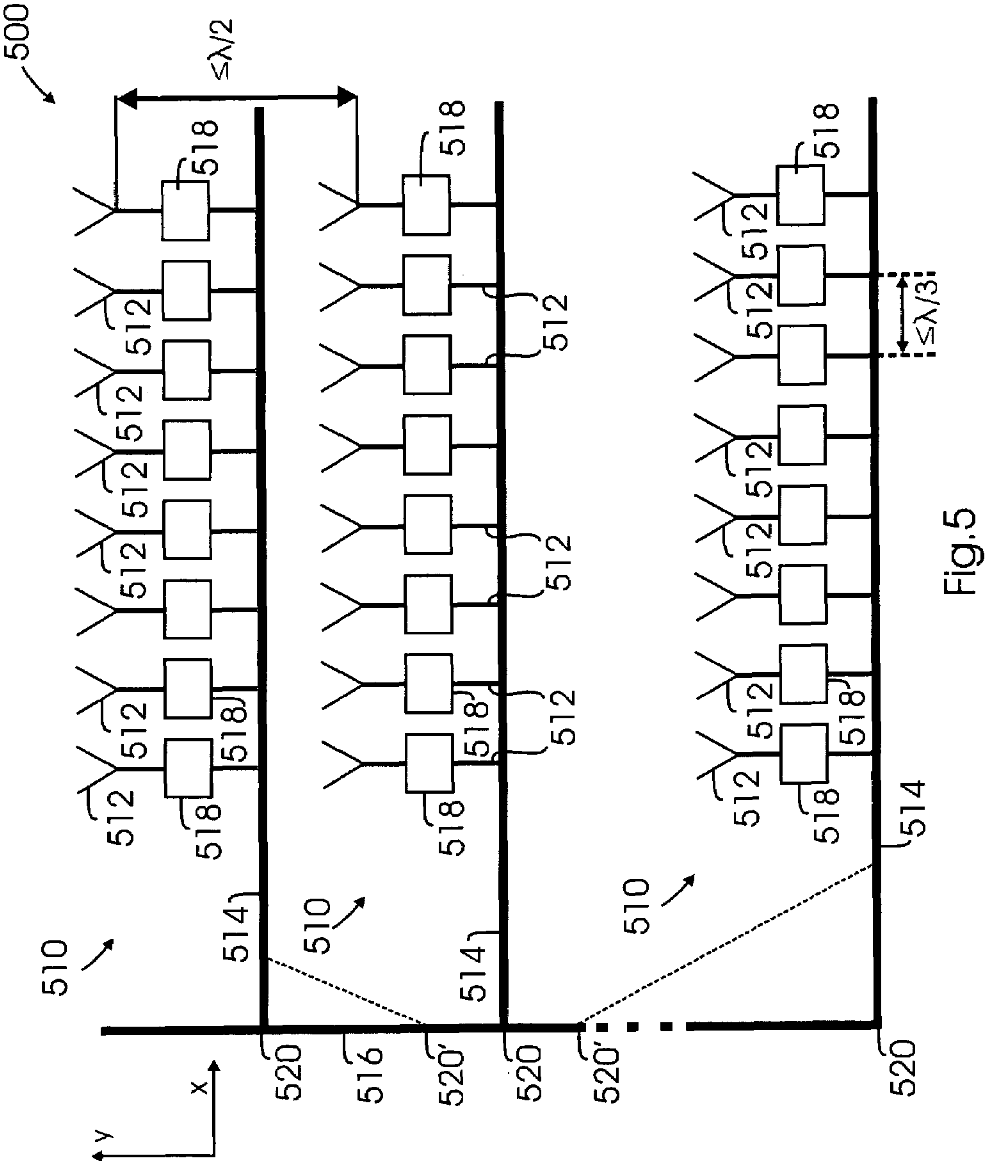
FIG. 5 is a schematic diagram of a plurality of beam-forming antennas in accordance with the present invention, wherein the antennas are arranged in a single plane, in parallel rows, to provide beam-shaping in three dimensions.

FIG. 5 illustrates a two-dimensional beam-forming antenna 500 that provides beam-shaping in three dimensions, the beam's direction being typically described by an azimuth angle and an elevation angle. The antenna 500 comprises a plurality of linear arrays 510 of individual antenna elements 512, wherein the arrays 510 are arranged in parallel and are coplanar. Each array 510 is coupled with a transmission line 514, and the transmission lines 514 are connected in parallel to a master transmission line 516 so as to form a parallel transmission line network. Each antenna element 512 is coupled to its respective transmission line 514 through an amplitude controlling device 518. The phase of the signal fed to each of the transmission lines 514 is determined by the location on the master transmission line 516 at which each transmission line is coupled to the master transmission line 516. Thus, as shown in FIG. 5, in one specific example, a first phase value is provided by coupling the transmission lines 514 to the master transmission line 516 at a first set of coupling points 520, while in a second specific example, a second phase value may be provided by coupling the transmission lines 514 to the master transmission line 516 at a second set of coupling points 520' (shown at the ends of phantom lines). Each linear array 510 is constructed in accordance with one of the configurations described above with respect to FIGS. 1-4. As an additional structural criterion, in the two-dimensional configuration, the distance between adjacent arrays 510 is less than or equal to one-half the wavelength, in the surrounding medium, of the electromagnetic signal transmitted and/or received by the antenna 500.

FIGS. 6*a*, 6*b* through 11*a*, 11*b* graphically illustrate exemplary beam shapes produced by an antenna constructed in accordance with the present invention. In general, as mentioned above, the amplitude controlling devices, be they switches, gain-controlled amplifiers, gain-controlled attenuators, or any functionally equivalent device, are controlled by a suitably-programmed computer (not shown). The computer operates each amplitude controlling device to provide a specific signal oscillation amplitude in each antenna element, whereby the oscillation amplitudes that are distributed across the element antenna array produce the desired beam shape (i.e., power peak direction, beam width, and side lobe distribution).

One specific way of providing computer-controlled operation of the amplitude controlling devices is to derive empirically, by numerical simulation, sets of amplitude values for the antenna element array that correspond to the values of the beam shape parameters for each desired beam shape. A look-up table with these sets of amplitude values and beam shape parameter values is then created and stored in the memory of the computer. The computer is programmed to receive an input corresponding to the desired beam shape parameter values, and then to generate input signals that represent these values. The computer then looks up the corresponding set of amplitude values. An output signal (or set of output signals) representing the amplitude values is then fed to the amplitude controlling devices to produce an amplitude distribution along the array that produces the desired beam shape.

Figure 6A:
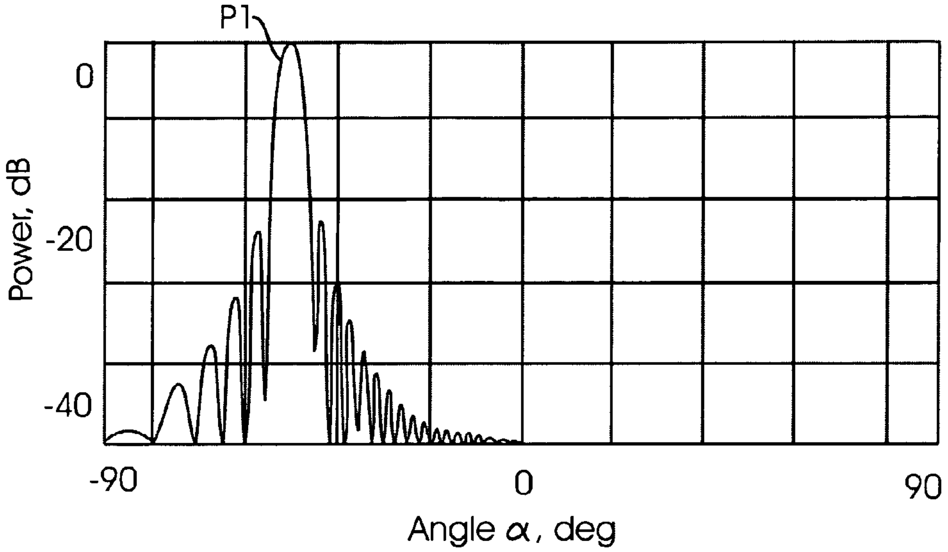
FIG. 6*a* is a first exemplary far-field beam shape produced by a beam-forming antenna in accordance with the present invention, wherein $\alpha$ denotes the azimuth angle.
Figure 6B:
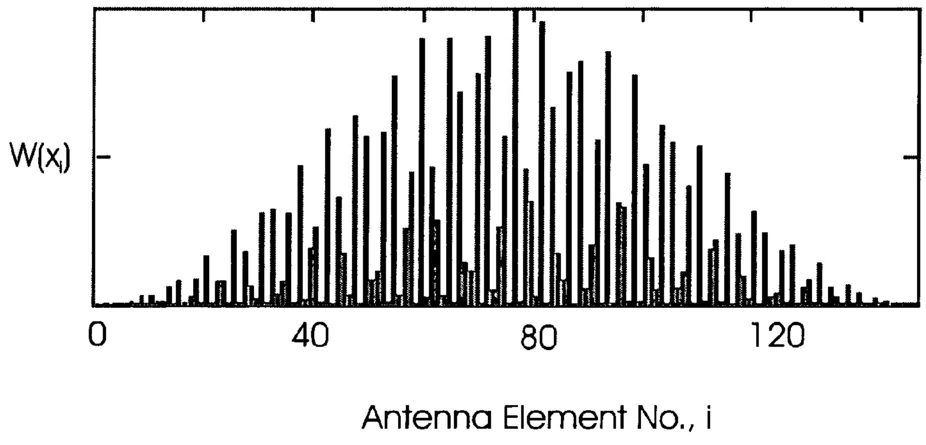
FIG. 6*b* is a graph of the RF power distribution for the array of antenna elements that results in the beam shape of FIG. 6*a;*

A first exemplary beam shape is shown in FIG. 6*a*, having a peak P1 at about −50° in the azimuth, with a moderate beam width and a side lobe distribution having a relatively gradual drop-off. The empirically-derived oscillation amplitude distribution (expressed as the RF power for each antenna element i) that produces the beam shape of FIG. 6*a* is shown in FIG. 6*b*.

Figure 7A:
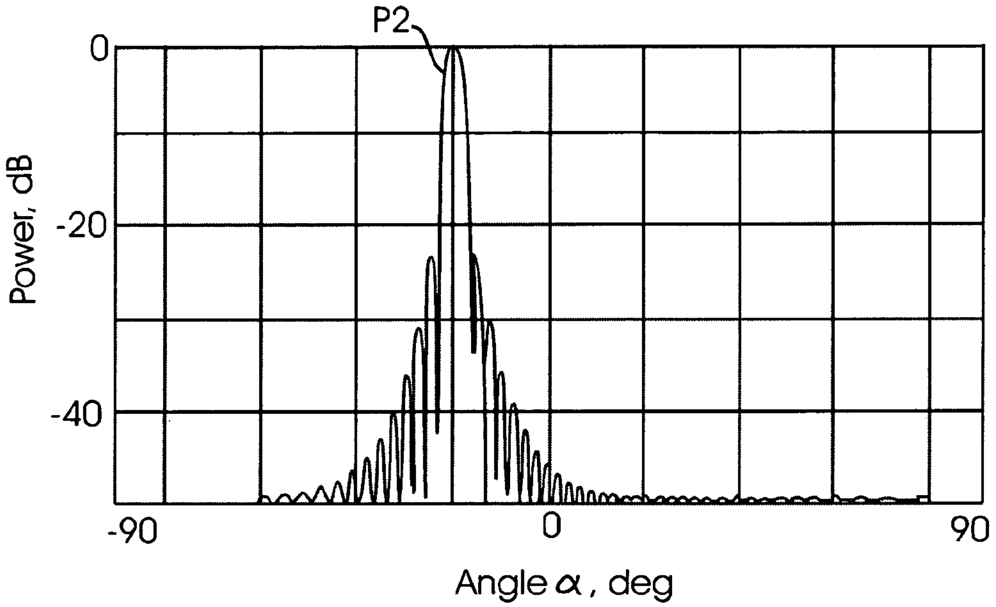
FIG. 7*a* is a second exemplary far-field beam shape produced by a beam-forming antenna in accordance with the present invention, wherein a denotes the azimuth angle.
Figure 7B:
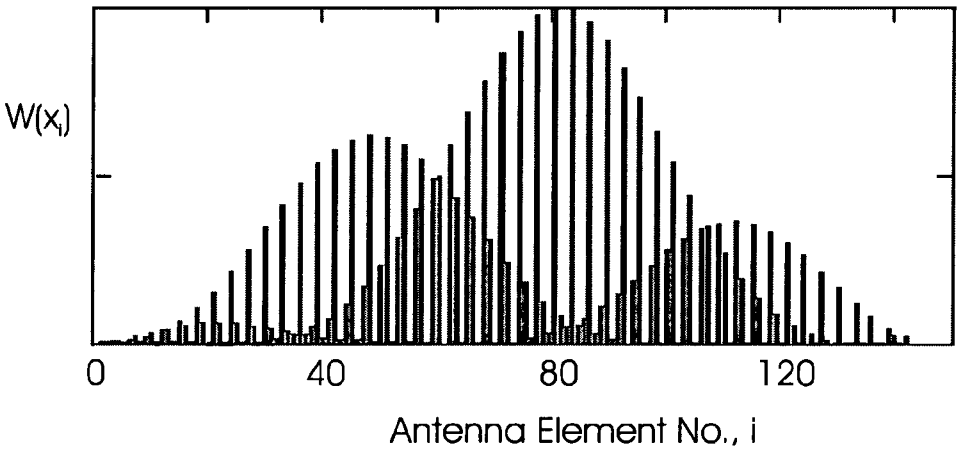
FIG. 7*b* is a graph of the RF power distribution for the array antenna elements that results in the beam shape of FIG. 7*a;*

A second exemplary beam shape is shown in FIG. 7*a*, having a peak P2 at about −20° in the azimuth, with a narrow beam width and a side lobe distribution having a relatively steep drop-off. The empirically-derived oscillation amplitude distribution that produces the beam shape of FIG. 7*a* is shown in FIG. 7*b*.

Figure 8A:
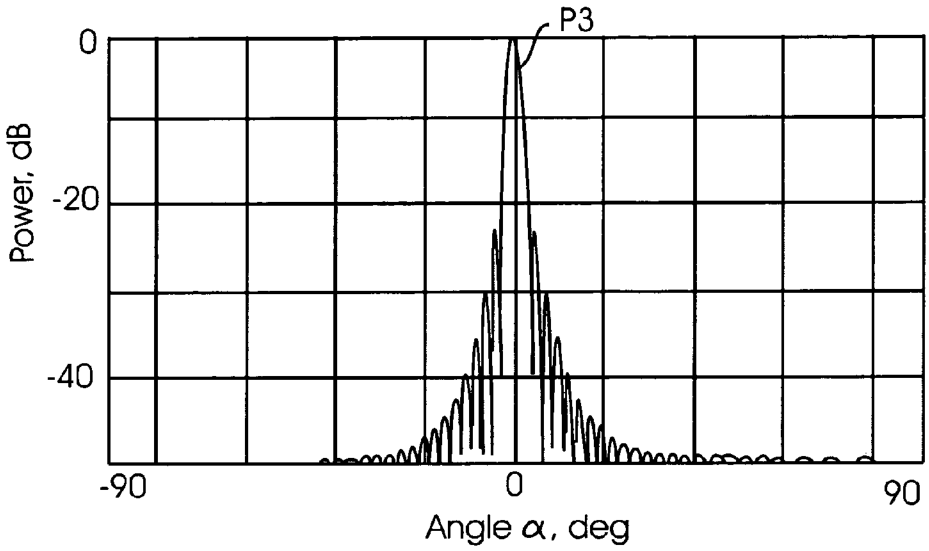
FIG. 8*a* is a third exemplary far-field beam shape produced by a beam-forming antenna in accordance with the present invention, wherein $\alpha$ denotes the azimuth angle.
Figure 8B:
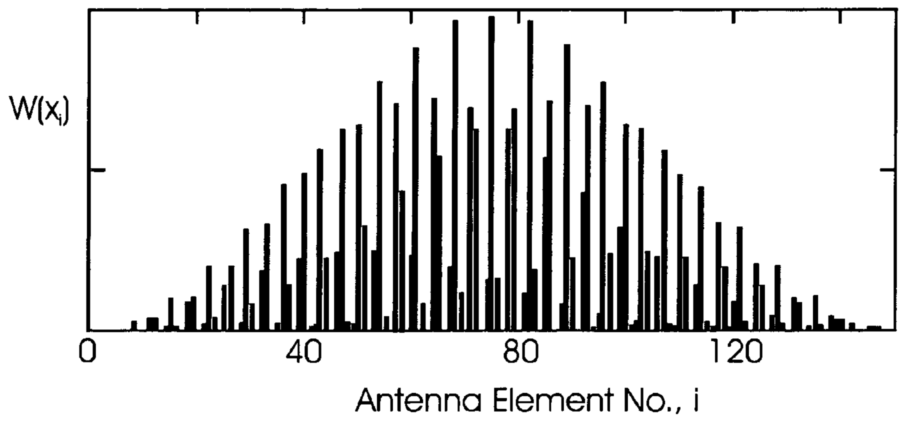
FIG. 8*b* is a graph of the RF power distribution for the array of antenna elements that results in the beam shape of FIG. 8*a;*

A third exemplary beam shape is shown in FIG. 8*a*, having a peak P3 at about 0° in the azimuth, with a narrow beam width and a side lobe distribution having a relatively steep drop-off. The empirically-derived oscillation amplitude distribution that produces the beam shape of FIG. 8*a* is shown in FIG. 8*b*.

Figure 9A:
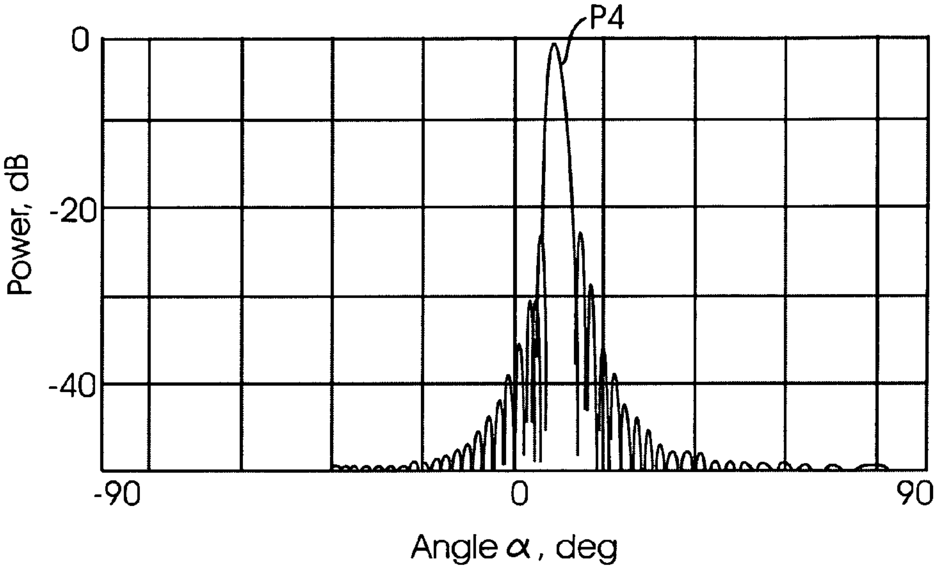
FIG. 9*a* is a fourth exemplary far-field beam shape produced by a beam-forming antenna in accordance with the present invention, wherein $\alpha$ denotes the azimuth angle.
Figure 9B:
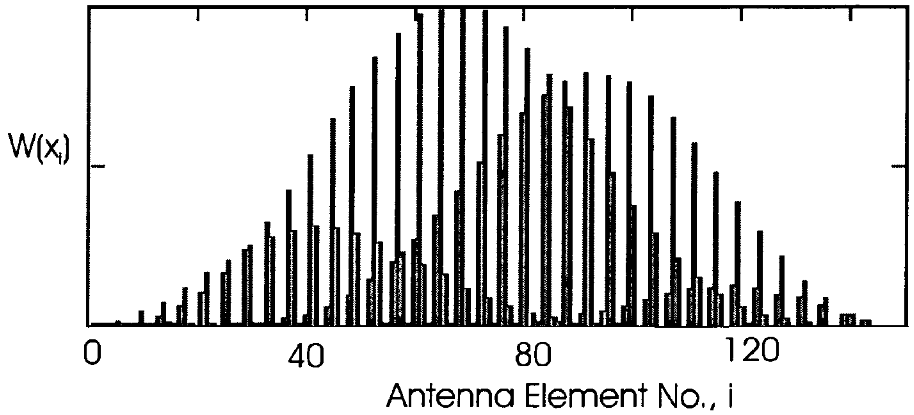
FIG. 9*b* is a graph of the RF power distribution for the array of antenna elements that results in the beam shape of FIG. 9*a;*

A fourth exemplary beam shape is shown in FIG. 9*a*, having a peak P4 at about +10° in the azimuth, with a moderate beam width and a side lobe distribution having a relatively steep drop-off. The empirically-derived oscillation amplitude distribution that produces the beam shape of FIG. 9*a* is shown in FIG. 9*b*.

Figure 10A:
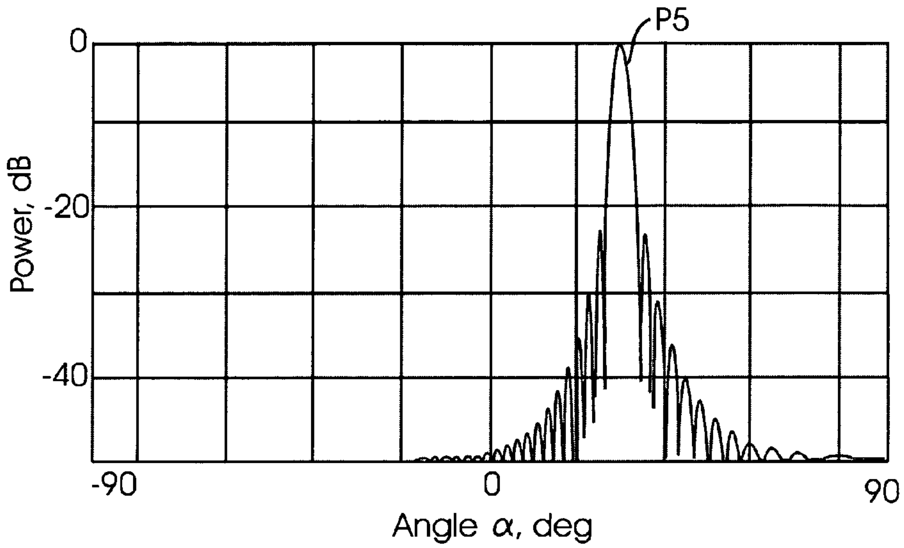
FIG. 10*a* is a fifth exemplary far-field beam shape produced by a beam-forming antenna in accordance with the present invention, wherein α denotes the azimuth angle.
Figure 10B:
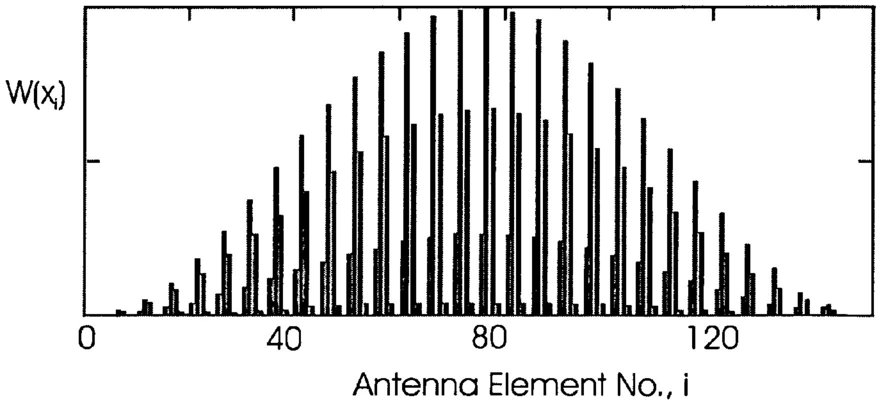
FIG. 10*b* is a graph of the RF power distribution for the array of antenna elements that results in the beam shape of FIG. 10*a;*

A fifth exemplary beam shape is shown in FIG. 10*a*, having a peak P5 at about +30° in the azimuth, with a moderate beam width and a side lobe distribution having a relatively steep drop-off. The empirically-derived oscillation amplitude distribution that produces the beam shape of FIG. 10*a* is shown in FIG. 10*b*.

Figure 11A:
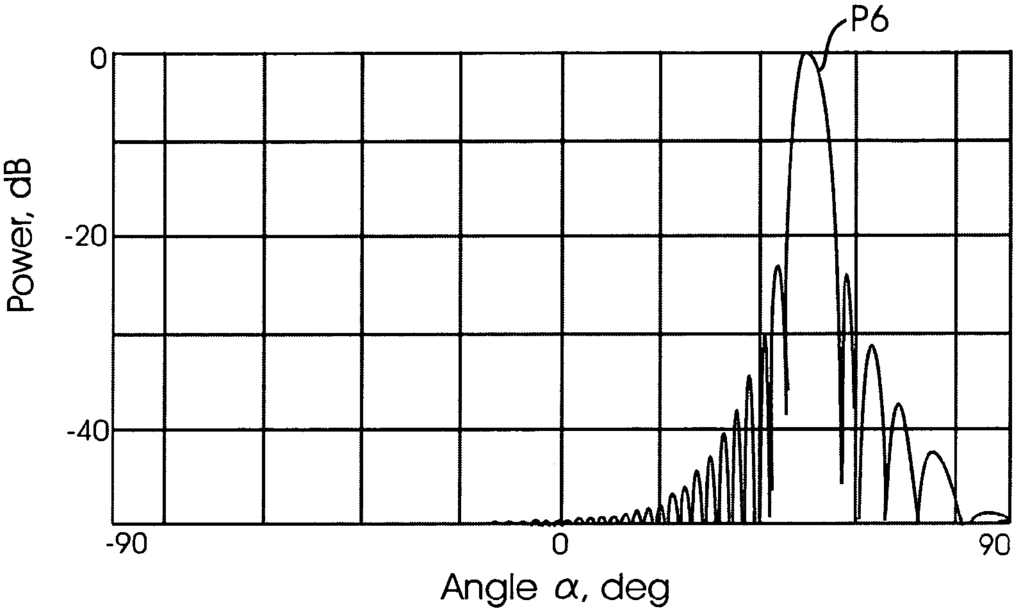
FIG. 11*a* is a sixth exemplary far-field beam shape produced by a beam-forming antenna in accordance with the present invention, wherein α denotes the azimuth angle.
Figure 11B:
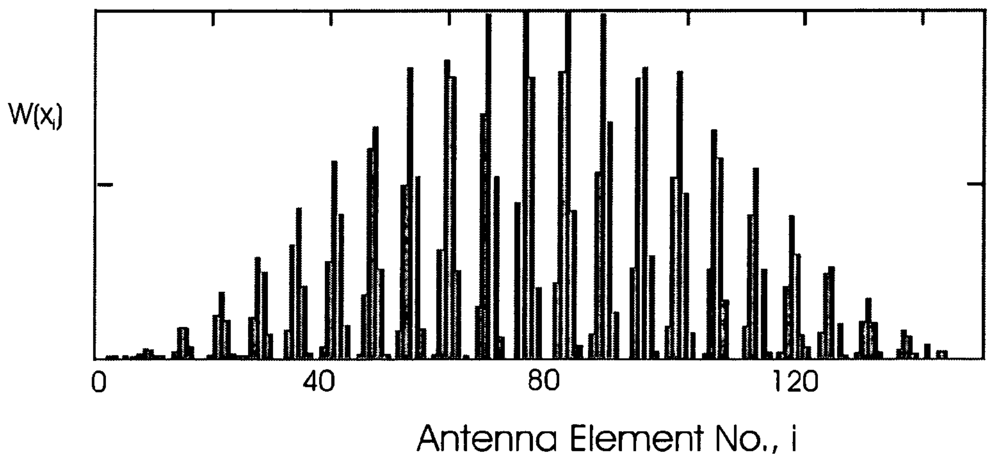
FIG. 11*b* is a graph of the RF power distribution for the array of antenna elements that results in the beam shape of FIG. 11*a*.
Figure 12:
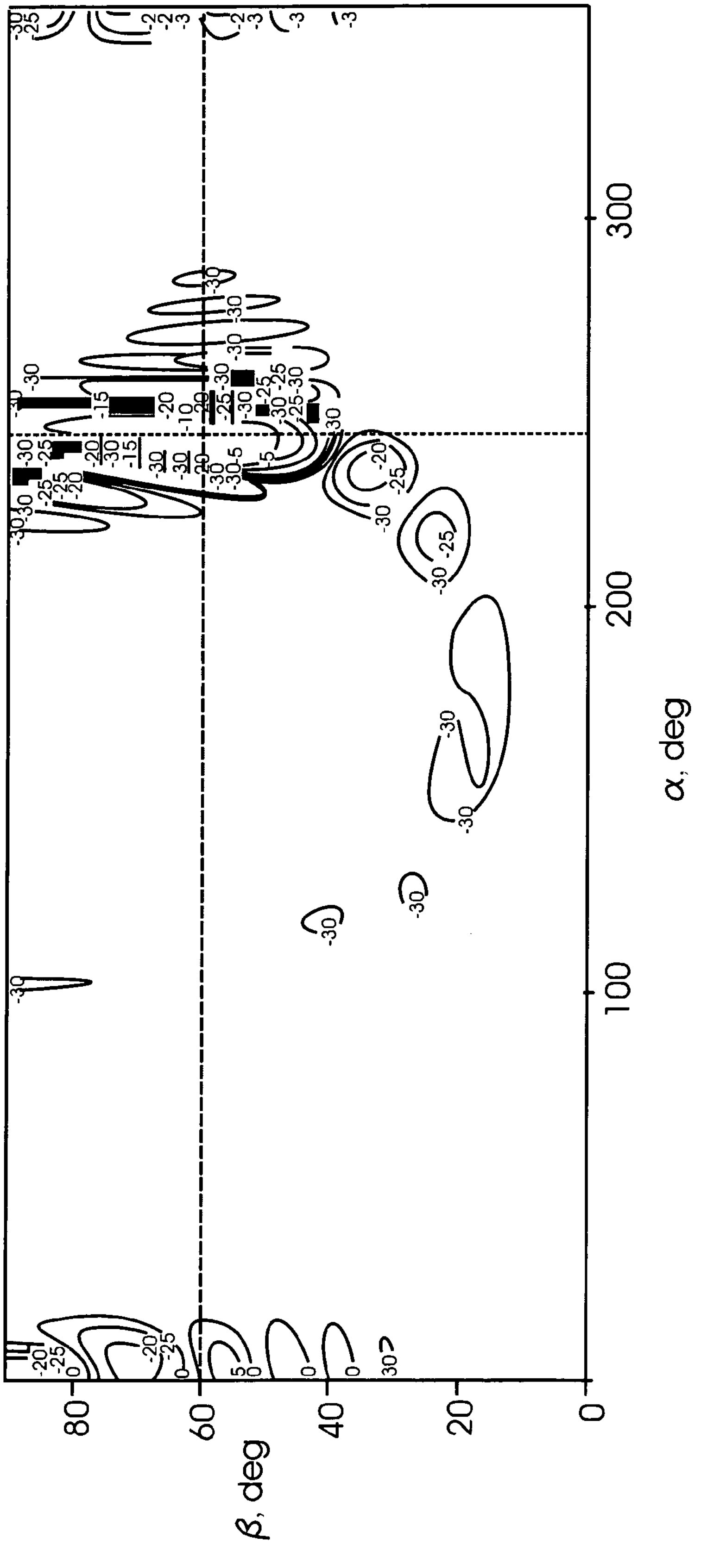
FIGS. 12-14 are graphs of exemplary far-field power distributions produced in three dimensions by a 2-dimensional beam-forming antenna in accordance with the present invention, wherein α represents azimuth and β represents elevation, and wherein the power contours on the graph are measured in dB.
Figure 13:
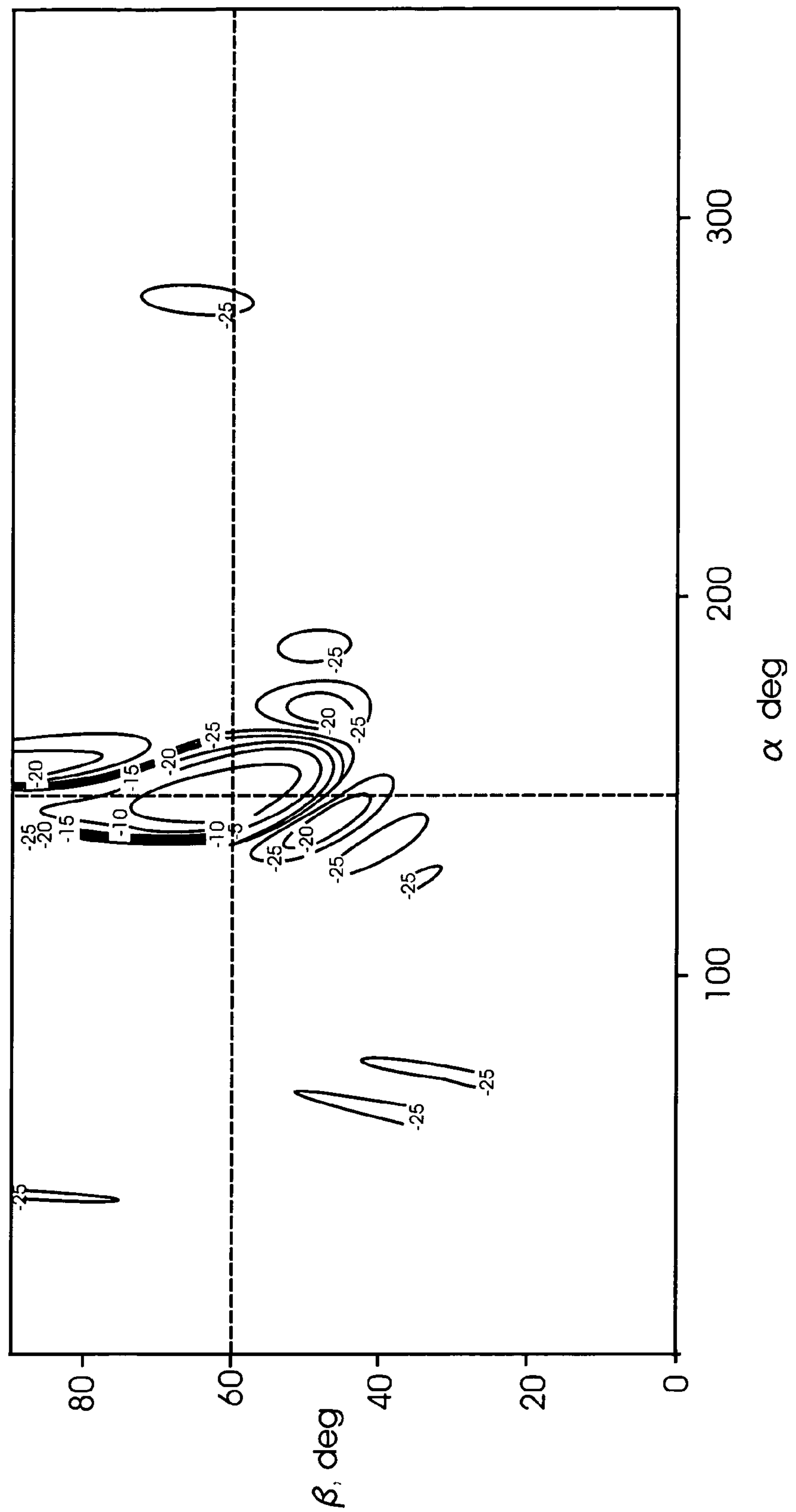
Figure 14:
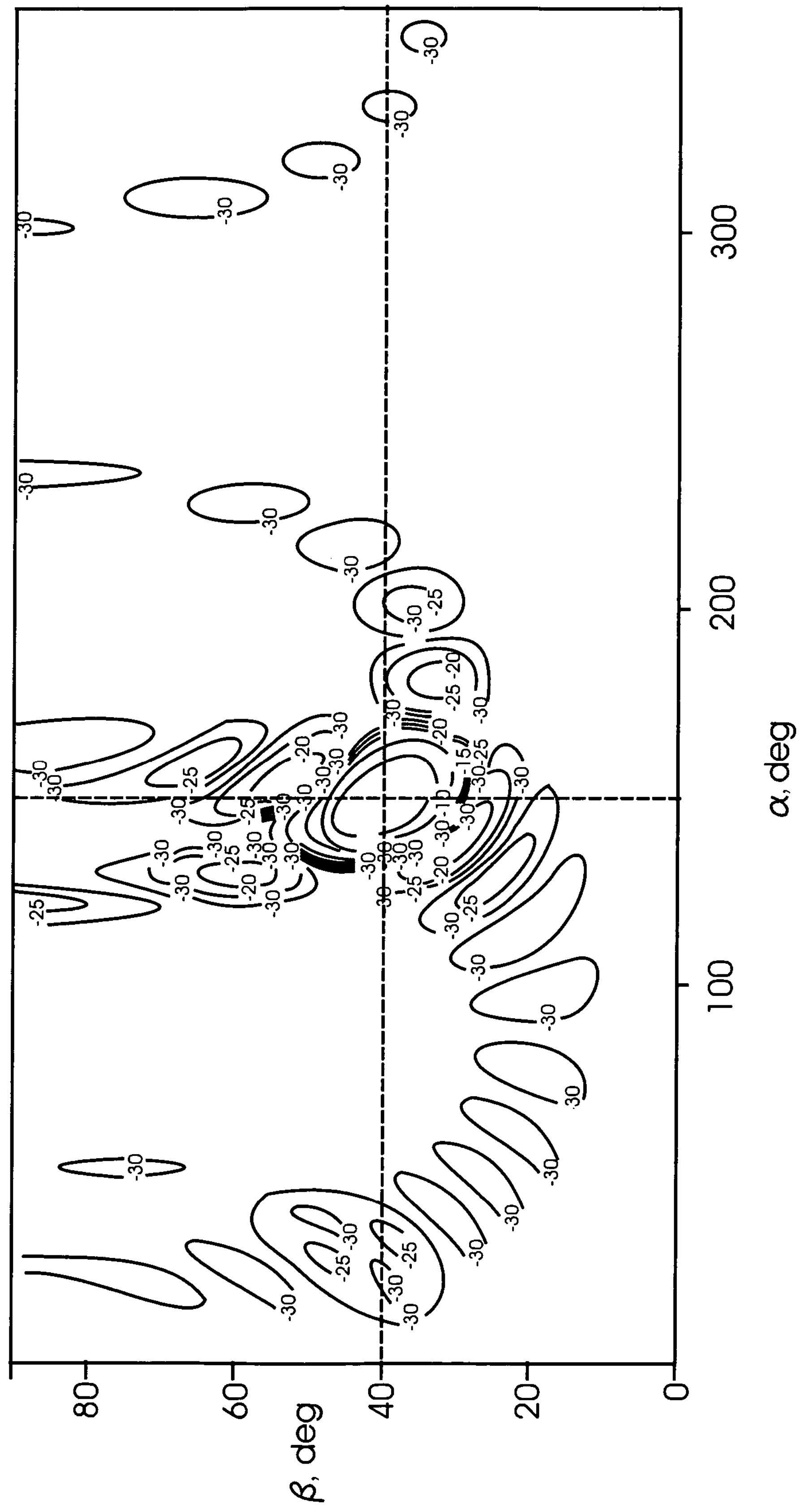

A sixth exemplary beam shape is shown in FIG. 11*a*, having a peak P6 at about +50° in the azimuth, with a relatively broad beam width and a side lobe distribution having a moderate drop-off. The empirically-derived oscillation amplitude distribution that produces the beam shape of FIG. 11*a* is shown in FIG. 11*b*.

FIGS. 12-17 graphically illustrate exemplary far field power distributions produced by a two-dimensional beam-forming antenna, such as the antenna 500 described above and shown schematically in FIG. 5. In these graphs, the azimuth is labeled α, and the elevation is labeled β. The power contours are measured in dB.

From the foregoing description and examples, it will be appreciated that the present invention provides a beam-forming antenna that offers highly-controllable beam-shaping capabilities, wherein all beam shape parameters (angular location of the beam's power peak, the beamwidth of the power peak, and side lobe distribution) can be controlled with essentially the same precision as in phased array antennas, but at significantly reduced manufacturing cost, and with significantly enhanced operational stability.

While exemplary embodiments of the invention have been described herein, including those embodiments encompassed within what is currently contemplated as the best mode of practicing the invention, it will be apparent to those skilled in the pertinent arts that a number of variations and modifications of the disclosed embodiments may suggest themselves to such skilled practitioners. For example, as noted above, amplitude controlling devices that are functionally equivalent to those specifically described herein may be found to be suitable for practicing the present invention. Furthermore, even within the specifically-enumerated categories of devices, there will be a wide variety of specific types of components that will be suitable. For example, in the category of switches, there is a wide variety of semiconductor switches, optical switches, solid state switches, etc. that may be employed. In addition, a wide variety of transmission lines (e.g., waveguides) and antenna elements (e.g., dipoles) may be employed in the present invention. These and other variations and modifications that may suggest themselves are considered to be within the spirit and scope of the invention, as defined in that claims that follow.

What is claimed is:

1. A beam-forming antenna for transmitting and/or receiving an RF electromagnetic signal, the antenna comprising:

a plurality of antenna elements arranged in a linear array;

a transmission line electromagnetically coupled serially with the antenna elements, whereby an RF electromagnetic signal is communicated serially between the transmission line and each of the antenna elements; and means for individually controlling the amplitude of the RF electromagnetic signal communicated between each of the antenna elements and the transmission line in accordance with a set of amplitude values, each of which corresponds to one of the antenna elements, whereby an amplitude distribution is produced along the array that results in a desired beam shape and direction for the electromagnetic signal, without controlled phase-shifting of the RF electromagnetic signal between the transmission line and the antenna elements.

2. The beam-forming antenna of claim 1, wherein the RF electromagnetic signal has a selected wavelength, and wherein the antenna elements are separated from each other by spacing distances that do not exceed one-third the selected wavelength.

3. The beam-forming antenna of claim 1, wherein the means for controlling the amplitude comprises an amplitude controlling device operatively associated with each of the antenna elements.

4. The beam-forming antenna of claim 3, wherein the amplitude controlling devices are operated under the control of a computer program that produces the set of amplitude values.

5. The beam-forming antenna of claim 3, wherein the amplitude controlling devices are selected from the group consisting of switches, gain-controlled amplifiers, and gain-controlled attenuators.

6. The beam-forming antenna of claim 2, wherein the spacing distances are approximately equal.

7. The beam-forming antenna of claim 2, wherein less than all of the spacing distances are equal.

8. The beam-forming antenna of claim 1, wherein the plurality of antenna elements is a first plurality arranged in a first linear array, and wherein the antenna further comprises:

at least a second plurality of antenna elements arranged in a second linear array that is parallel to the first linear array; and a second transmission line electromagnetically coupled serially with the antenna elements in the second linear array of antenna elements.

9. The beam-forming antenna of claim 8, wherein the electromagnetic signal has a selected wavelength and wherein the antenna elements in each array are separated from each other by a spacing distance that does not exceed one-third the selected wavelength, and wherein the linear arrays are separated from each other by a distance that does not exceed one-half the selected wavelength.

10. A beam-forming antenna for transmitting and/or receiving an oscillating RF electromagnetic signal, the antenna comprising:

a plurality of antenna elements arranged in a linear array;

a transmission line arranged with respect to the array of antenna elements for electromagnetically coupling the RF signal serially between the transmission line and the antenna elements;

means for producing a set of amplitude values, each of which corresponds to an RF signal amplitude between the transmission line and one of the antenna elements; and a plurality of amplitude controlling devices, each of which is operatively associated with one of the antenna elements, wherein the amplitude controlling devices are operable, in response to the means for producing a set of amplitude values, to individually control the amplitude of the RF electromagnetic signal coupled between each of the antenna elements and the transmission line in accordance with the set of amplitude values, whereby an amplitude distribution is produced along the array that results in a desired beam shape and direction for the electromagnetic signal without controlled phase-shifting of the RF electromagnetic signal coupled between the antenna elements and the transmission line.

11. The beam-forming antenna of claim 10, wherein the amplitude controlling devices are selected from the group consisting of switches, gain-controlled amplifiers, and gain-controlled attenuators.

12. The beam-forming antenna of claim 10, wherein the amplitude controlling devices are operated under the control of a computer program as the mean for producing the set of amplitude values.

13. The beam-forming antenna of claim 10, wherein the plurality of antenna elements is a first plurality arranged in a first linear array, and wherein the antenna further comprises:

a least a second plurality of antenna elements arranged in a second linear array that is parallel to the first linear array, wherein the linear arrays are coplanar; and a second transmission line arranged for electromagnetically coupling the RF signal serially to the antenna elements in the second linear array of antenna elements.

14. The beam-forming antenna of claim 13, wherein the electromagnetic signal has a selected wavelength, and wherein the linear arrays are separated from each other by a distance that does not exceed one-half the selected wavelength.

15. A method of controllably varying the beam shape of an oscillating RF electromagnetic signal having a selected wavelength that is transmitted or received by a plurality of antenna elements in a linear array of antenna elements that are electromagnetically coupled to a transmission line, wherein the method comprises the step of controllably varying the amplitude of the RF signal coupled between the transmission line and each antenna element in the array of antenna elements in accordance with a set of amplitude values, each of which corresponds to one of the antenna elements, whereby an amplitude distribution is produced along the array that results in a desired beam shape and direction for the electromagnetic signal, without controlled phase-shifting of the RF signal coupled between the transmission line and the antenna elements.

16. The method of claim 15, wherein the step of controllably varying the amplitude of the signal is performed by an amplitude controlling device operatively associated with each of the antenna elements.

17. The method of claim 16, wherein the amplitude controlling devices are operated under the control of a computer program that produces the set of amplitude values.

18. A reconfigurable, directional antenna, operable for both transmission and reception of an RF electromagnetic signal of a selected wavelength, comprising:

a linear array of individually controllable antenna elements, each of which is oscillated by the signal with a controllable amplitude, wherein the amplitude for each antenna element corresponds to one of a set of amplitude values, whereby an amplitude distribution is produced along the array that results in a desired beam shape and direction for the electromagnetic signal without controlled phase-shifting of the electromagnetic signal; and a transmission line that is arranged for electromagnetically coupling the RF signal serially to the antenna elements in the linear array.

19. The antenna of claim 18, wherein the antenna elements are separated from each other by spacing distances that do not exceed one-third the selected wavelength.

20. The antenna of claim 18, wherein the amplitude is controlled by an amplitude controlling device operatively associated with each of the antenna elements.

21. The antenna of claim 20, wherein the amplitude controlling devices are selected from the group consisting of switches, gain-controlled amplifiers, and gain-controlled attenuators.

22. The antenna of claim 18, wherein the plurality of antenna elements is a first plurality arranged in a first linear array, and wherein the antenna further comprises:

at least a second plurality of individually controllable antenna elements arranged in a second linear array that is parallel to the first linear array, wherein the linear array are coplanar; and a second transmission line arranged for electromagnetically coupling the RF signal serially to he antenna elements in the second linear array of antenna elements.

* * * * *